United States Patent
Sasage et al.

(10) Patent No.: US 6,843,845 B2
(45) Date of Patent: Jan. 18, 2005

(54) ADMIXTURE AND EXTRUDABLE HYDRAULIC COMPOSITION

(75) Inventors: Yoshiaki Sasage, Niigata-ken (JP); Tsutomu Yamakawa, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 9 days.

(21) Appl. No.: 10/384,673

(22) Filed: Mar. 11, 2003

(65) Prior Publication Data

US 2003/0167974 A1 Sep. 11, 2003

(30) Foreign Application Priority Data

Mar. 11, 2002 (JP) ........................................ 2002-065223

(51) Int. Cl.$^7$ ............................................. C04B 16/02
(52) U.S. Cl. .................... 106/805; 106/172.1; 106/726; 536/84; 536/90; 536/91; 536/95; 536/96; 536/99
(58) Field of Search .............................. 106/172.1, 726, 106/805; 536/84, 90, 91, 95, 96, 99

(56) References Cited

U.S. PATENT DOCUMENTS 4,784,693 A * 11/1988 Kirkland et al. ............ 106/730

FOREIGN PATENT DOCUMENTS

| JP | 56-155058 A | | 12/1981 |
|---|---|---|---|
| JP | 60-239348 A | * | 11/1986 |
| JP | 1-294555 A | | 11/1989 |
| JP | 1-305838 A | * | 12/1989 |
| JP | 2-102154 A | * | 4/1990 |
| JP | 10-053448 A | | 2/1998 |

OTHER PUBLICATIONS

Machine translation of Japanese Patent Specification No. 10–053448 A(Feb. 1998).*

* cited by examiner

*Primary Examiner*—Anthony J. Green
(74) *Attorney, Agent, or Firm*—Birch, Stewart, Kolasch & Birch, LLP

(57) ABSTRACT

An admixture comprising (A) a nonionic water-soluble hydroxyethyl cellulose and/or hydroxyethyl ethyl cellulose having a viscosity of at least 500 mPa·s as measured in a 1 wt % aqueous solution at 20° C., and (B) another nonionic water-soluble cellulose ether having a viscosity of at least 1,500 mPa·s as measured in a 1 wt % aqueous solution at 20° C. is suited for use in extrudable hydraulic compositions, because the hydraulic compositions comprising the admixture are effectively extrudable into hardened products having improved surface properties, minimized spring-back and good dimensional accuracy.

15 Claims, No Drawings

ADMIXTURE AND EXTRUDABLE HYDRAULIC COMPOSITION

TECHNICAL FIELD

This invention relates to admixtures for use in hydraulic compositions, and hydraulic compositions suited for extrusion to form hardened products having minimized spring-back and improved surface smoothness.

BACKGROUND OF THE INVENTION

In prior art hydraulic compositions for extrusion to form siding members or the like, pulp fibers are often used for the purposes of shape retention, nail holding, weight reduction, and strength enhancement. In the recent consideration to avoid the use of asbestos, it becomes a frequent practice to achieve the required performance by increasing the length of pulp fibers, but at the sacrifice of extrudability.

In most compositions, the amount of nonionic water-soluble cellulose ethers used as processing aids is increased to compensate for extrudability although the mixed compound is increased in plasticity at the same time. There occurs a spring-back phenomenon that shaped plates expand due to pressure release immediately after discharge from the die. The shaped plates must be subsequently ground to a predetermined size.

Due to the increased plasticity resulting from the increased amount of nonionic water-soluble cellulose ether added, a shaped plate is discharged from the die at a discharge rate which differs at different positions of the plate or along the cross-sectional shape of the plate. This gives rise to problems of crazed surface and surface asperities, detracting from the product yield.

SUMMARY OF THE INVENTION

An object of the present invention is to provide an admixture for use in extrudable hydraulic compositions, and a hydraulic composition comprising the admixture and suited for extrusion to form shaped products having minimized spring-back and improved surface smoothness.

The inventor has found that a hydraulic composition using as an admixture a combination of nonionic water-soluble cellulose ether having a viscosity in a specific range with hydroxyethyl cellulose and/or hydroxyethyl ethyl cellulose having a viscosity in another specific range is effectively extrudable to form a hardened product having good surface smoothness, minimized spring-back and improved dimensional accuracy.

Accordingly, the present invention provides an admixture for extrudable hydraulic compositions, comprising (A) a nonionic water-soluble hydroxyethyl cellulose and/or nonionic water-soluble hydroxyethyl ethyl cellulose having a viscosity of at least 500 mPa·s as measured in a 1 wt % aqueous solution at 20° C. by a Brookfield viscometer at 12 rpm, and (B) at least one cellulose selected from the group consisting of nonionic water-soluble alkyl celluloses, nonionic water-soluble hydroxyalkyl celluloses other than the hydroxyethyl cellulose, and nonionic water-soluble hydroxyalkyl alkyl celluloses other than the hydroxyethyl ethyl cellulose, having a viscosity of at least 1,500 mPa·s as measured in a 1 wt % aqueous solution at 20° C. by a Brookfield viscometer at 12 rpm.

An extrudable hydraulic composition comprising the admixture is also contemplated herein.

DETAILED DESCRIPTION OF THE INVENTION

In the admixture for extrudable hydraulic compositions, component (A) is a nonionic water-soluble hydroxyethyl cellulose and/or nonionic water-soluble hydroxyethyl ethyl cellulose, which should have a viscosity of at least 500 mPa·s as measured in a 1 wt % aqueous solution at 20° C. by a Brookfield viscometer at 12 rpm. The viscosity is preferably 500 to 50,000 mPa·s, more preferably 1,000 to 50,000 mPa·s, and most preferably 2,000 to 50,000 mPa·s. This cellulose ether is less viscous in cement compositions than other nonionic water-soluble cellulose ethers and prevents the mixed composition from being endowed with excessive plasticity, offering the advantage that a cellulose ether having a relatively high viscosity is usable.

Component (B) is at least one water-soluble cellulose ether selected from among nonionic water-soluble alkyl celluloses, nonionic water-soluble hydroxyalkyl celluloses other than the hydroxyethyl cellulose, and nonionic water-soluble hydroxyalkyl alkyl celluloses other than the hydroxyethyl ethyl cellulose. Examples include methyl cellulose, ethyl cellulose, hydroxypropyl cellulose, hydroxyethyl methyl cellulose and hydroxypropyl methyl cellulose. The nonionic water-soluble cellulose ether (B) should have a viscosity of at least 1,500 mPa·s as measured in a 1 wt % aqueous solution at 20° C. by a Brookfield viscometer at 12 rpm. The viscosity is preferably 1,500 to 50,000 mPa·s, more preferably 2,500 to 50,000 mPa·s, and most preferably 3,000 to 50,000 mPa·s. This cellulose ether may be added in small amounts, resulting in an economical advantage.

The hydroxyethyl cellulose and/or hydroxyethyl ethyl cellulose (A) and the other nonionic water-soluble cellulose ether (B) are mixed in a weight ratio from 5:95 to 95:5, preferably from 10:90 to 70:30, and more preferably from 20:80 to 50:50. Too low a proportion of hydroxyethyl cellulose and/or hydroxyethyl ethyl cellulose (A) may lead to increased spring-back whereas too high a proportion may result in a mixed composition which is too viscous to extrude.

On use, the admixture of the invention comprising components (A) and (B) defined above is added to an extrudable hydraulic composition. The amount of the admixture added (the total amount of nonionic cellulose ethers (A) and (B) combined) is an amount necessary to permit the hydraulic composition to be extruded, usually 0.1 to 2.0% by weight based on the entire components of the extrudable hydraulic composition excluding water, preferably 0.2 to 2.0% by weight and more preferably 0.2 to 1.5% by weight.

If necessary, another water-soluble polymer may be used along with the admixture of the invention for extrudable hydraulic compositions. Examples of other water-soluble polymers include partially saponified polyvinyl alcohol, modified starch, polyethylene oxide, wellan gum, and polyacrylamide.

The extrudable hydraulic composition of the invention contains the admixture defined above as well as conventional components such as hydraulic substances, aggregates, lightweight aggregates, and reinforcing fibers.

The hydraulic substances that harden in the presence of water include cement and gypsum. Cements include ordinary Portland cement, early-strength cement, blast furnace slag cement, fly-ash cement and alumina cement. Gypsum-based hydraulic substances include primarily the dihydrate, hemihydrate and anhydride forms of gypsum. The content of cement or gypsum-based hydraulic substances is not critical and may be set as needed to achieve the required strength.

Powdered silica and fly ash are typical aggregates. Besides, lightweight aggregates are used when weight reduction is desired, and include perlite, hollow microspheres, and styrene beads. Whether the aggregate is ordinary or lightweight, it is combined with the hydraulic substance so that the desired properties are achievable. The hydraulic substance and the aggregate are used in a weight ratio of from 10:90 to 100:0.

Reinforcing fibers are also useful in the hydraulic compositions. At present, pulp fibers that eliminate a concern about carcinogenicity become a substitute for asbestos and are widely used. In the practice of the invention, pulp fibers are advantageously used. Pulp fibers include fibers of virgin pulp, recycled paper pulp, and pulps originating from conifer and broadleaf woods, having an average length of about 200 to 2,000 $\mu$m. Polypropylene, vinylon and acrylic fibers are also useful. From the fire resistance and other standpoints, fibers are preferably used in amounts of 1 to 10 parts by weight provided that the total of the entire components of the hydraulic composition excluding water is 100 parts by weight.

If necessary, setting accelerators and retarders, and surface active agents such as water-reducing agents and dispersing agents are used. These agents are effective for managing the physical properties of a fresh hydraulic composition immediately after mixing of components with water. Any agent meeting a particular purpose may be added in a conventional amount.

To the hydraulic composition of the invention, water is added. The amount of water is conventional though it is determined in accordance with the type of hydraulic composition or the like. Water is preferably used in amounts of 20 to 80 parts by weight provided that the total of the entire components of the hydraulic composition excluding water is 100 parts by weight.

The hydraulic composition of the invention is obtainable by mixing the aforementioned components in a conventional manner. The hydraulic composition thus obtained is formed and hardened into a hardened body by an extrusion molding or suitable method.

EXAMPLES

Examples of the invention and comparative examples are provided to illustrate the invention, and are not intended to limit the scope thereof.

Examples 1–6 and Comparative Examples 1–7

Extrudable cement-based compositions formulated as shown in Tables 1 and 2 below were prepared from the following materials. Note that the viscosity of cellulose is that of a 1 wt % aqueous solution at 20° C. as measured by a Brookfield viscometer at 12 rpm.

(1) Cement: ordinary Portland cement
(2) Silica: sifted powdered silica
(3) Pulp: virgin pulp having an average fiber length of 1.2 mm, conditioned to a water content 20 wt %
(4) Perlite: average particle size 0.8 mm
(5) Hydroxyethyl cellulose 1: viscosity 2,000 mPa·s
Hydroxyethyl cellulose 2: viscosity 9,200 mPa·s
Hydroxyethyl cellulose 3: viscosity 120 mPa·s
(6) Hydroxyethyl ethyl cellulose 1: viscosity 1,000 mPa·s
Hydroxyethyl ethyl cellulose 2: viscosity 600 mPa·s
(7) Hydroxypropyl methyl cellulose 1: viscosity 1,500 mPa·s Hydroxypropyl methyl cellulose 2: viscosity 3,500 mPa·s Hydroxypropyl methyl cellulose 3: viscosity 1,200 mPa·s
(8) Hydroxyethyl methyl cellulose 1: viscosity 1,520 mPa·s Hydroxyethyl methyl cellulose 2: viscosity 3,800 mPa·s Hydroxyethyl methyl cellulose 3: viscosity 11,000 mPa·s In the Tables, abbreviation HEC is hydroxyethyl cellulose, HEEC is hydroxyethyl ethyl cellulose, HPMC is hydroxypropyl methyl cellulose, and HEMC is hydroxyethyl methyl cellulose.

The above materials other than water were mixed for 3 minutes in a Henschel mixer, and the prescribed amount of water was added. Immediately thereafter, the mixture was worked 4 minutes in a 10-liter kneader-extruder, then extruded in vacuum. The parts extruded through a die of 6×75 mm profile were examined for extrudability and surface smoothness, and the parts extruded through a die of 40 mm wide and 20 mm thick profile were examined for percent spring-back. The mixture was extruded, cured under sealed conditions at 65° C. for 15 hours and then cured in an autoclave at 170° C. and RH 100% for 8 hours. The test results of extrudability, surface smoothness and spring-back are shown in Tables 1 and 2.

The evaluation criteria of these tests are shown below.
(1) Extrudability: visually observed
  ◯: no meander nor breakage
  X: meander or breakage
(2) Surface smoothness: visual observation and hand feel
  ◯: no apparent asperities, not rough to the feel
  Δ: few apparent asperities, but rough to the feel
  X: apparent asperities
(3) Spring-back
  [(width of sample after autoclave curing)−(die width)] /(die width)×100%

TABLE 1

|  | Example | | | | | |
| --- | --- | --- | --- | --- | --- | --- |
|  | 1 | 2 | 3 | 4 | 5 | 6 |
| Materials (pbw) | | | | | | |
| (1) Cement | 43 | 43 | 43 | 43 | 43 | 43 |
| (2) Silica | 30 | 30 | 30 | 30 | 30 | 30 |
| (3) Pulp | 7 | 7 | 7 | 7 | 7 | 7 |
| (4) Perlite | 20 | 20 | 20 | 20 | 20 | 20 |
| (5)(6) Cellulose ether, type | HEC① | HEEC① | HEEC① | HEEC② | HEC② | HEC① |
| (5)(6) Cellulose ether, amount | 0.07 | 1.33 | 0.28 | 0.70 | 0.84 | 0.20 |

TABLE 1-continued

| | Example | | | | | |
|---|---|---|---|---|---|---|
| | 1 | 2 | 3 | 4 | 5 | 6 |
| (5)(6) Cellulose ether, type | | | | | | HEEC② |
| (5)(6) Cellulose ether, amount | | | | | | 0.2 |
| (7)(8) Cellulose ether, type | HPMC① | HPMC② | HEMC① | HEMC③ | HEMC③ | HPMC① |
| (7)(8) Cellulose ether, amount | 1.33 | 0.07 | 1.12 | 0.70 | 0.56 | 1.00 |
| Water | 55 | 55 | 55 | 55 | 55 | 55 |
| Results | | | | | | |
| Extrudability | ○ | ○ | ○ | ○ | ○ | ○ |
| Surface smoothness | ○ | ○ | ○ | ○ | ○ | ○ |
| Spring-back (%) | 2.1 | 2.2 | 2.2 | 2.4 | 2.3 | 2.2 |

TABLE 2

| | Comparative Example | | | | | | |
|---|---|---|---|---|---|---|---|
| | 1 | 2 | 3 | 4 | 5 | 6 | 7 |
| Materials (pbw) | | | | | | | |
| (1) Cement | 43 | 43 | 43 | 43 | 43 | 43 | 43 |
| (2) Silica | 30 | 30 | 30 | 30 | 30 | 30 | 30 |
| (3) Pulp | 7 | 7 | 7 | 7 | 7 | 7 | 7 |
| (4) Perlite | 20 | 20 | 20 | 20 | 20 | 20 | 20 |
| (5)(6) Cellulose ether, type | HEC② | HEC③ | HEC③ | | | HEC② | HEEC① |
| (5)(6) Cellulose ether, amount | 0.42 | 0.7 | 0.98 | | | 1.4 | 1.4 |
| (7)(8) Cellulose ether, type | HPMC③ | HPMC③ | HPMC① | HPMC② | HEMC② | | |
| (7)(8) Cellulose ether, amount | 0.98 | 0.7 | 0.42 | 1.4 | 1.4 | | |
| Water | 55 | 55 | 55 | 55 | 55 | 50 | 50 |
| Results | | | | | | | |
| Extrudability | ○ | X | X | ○ | ○ | X | X |
| Surface smoothness | Δ | — | — | X | X | — | — |
| Spring-back (%) | 5.3 | — | — | 6.8 | 7.4 | — | — |

As is evident from Tables 1 and 2, the compositions of Examples are effectively extruded into parts having good surface smoothness and minimized spring-back. In contrast, some of the compositions of Comparative Examples are extruded into parts having poor surface smoothness and notable spring-back, and the remaining compositions are not extrudable.

There has been described an admixture which is suited for use in extrudable hydraulic compositions, because the hydraulic compositions comprising the admixture are effectively extrudable into hardened products having improved surface smoothness, minimized spring-back and good dimensional accuracy.

Japanese Patent Application No. 2002-065223 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A hydraulic composition admixture, comprising
   (A) a nonionic water-soluble hydroxyethyl cellulose and/or nonionic water-soluble hydroxyethyl ethyl cellulose having a viscosity of at least 500 mPa·s as measured in a 1 wt % aqueous solution at 20° C. by a Brookfield viscometer at 12 rpm, and
   (B) at least one cellulose ether selected from the group consisting of nonionic water-soluble alkyl celluloses, nonionic water-soluble hydroxyalkyl celluloses other than the hydroxyethyl cellulose, and nonionic water-soluble hydroxyalkyl alkyl celluloses other than the hydroxyethyl ethyl cellulose, having a viscosity of at least 1,500 mPa·s as measured in a 1 wt % aqueous solution at 20° C. by a Brookfield viscometer at 12 rpm wherein the hydroxyethyl cellulose and/or hydroxyethyl ethyl cellulose (A) and the other nonionic water-soluble cellulose ether (B) are present in a weight ratio from 95:5 to 50:50.

2. An extrudable hydraulic composition comprising the admixture of claim 1.

3. The admixture of claim 1 wherein the cellulose ether (B) is a member selected from the group consisting of methyl cellulose; ethyl cellulose; hydroxypropyl cellulose; hydroxyethyl methyl cellulose; hydroxypropyl methyl cellulose; and mixtures thereof.

4. The admixture of claim 1 wherein the viscosity of component (A) is 500 to 50,000 mPa·s.

5. The admixture of claim 1 wherein the viscosity of component (A) is 1,000 to 50,000 mPa·s.

6. The admixture of claim 1 wherein the viscosity of component (A) is 2,000 to 50,000 mPa·s.

7. The admixture of claim 1 wherein the viscosity of component (B) is 1,500 to 50,000 mPa·s.

8. The admixture of claim 1 wherein the viscosity of component (B) is 2,500 to 50,000 mPa·s.

9. The admixture of claim 1 wherein the viscosity of component (B) is 3,000 to 50,000 mPa·s.

10. The admixture of claim 1 wherein the hydroxyethyl cellulose and/or hydroxyethyl ethyl cellulose (A) and the other nonionic water-soluble cellulose ether (B) are present in a weight ratio from 10:90 to 70:30.

11. The admixture of claim 1 wherein the hydroxyethyl cellulose and/or hydroxyethyl ethyl cellulose (A) and the other nonionic water-soluble cellulose ether (B) are present in a weight ratio from 20:80 to 50:50.

12. The admixture of claim 1 further comprising another water-soluble polymer.

13. The admixture of claim 1 further comprising a member selected from the group consisting of partially saponified polyvinyl alcohol; modified starch; polyethylene oxide; wellan gum; polyacrylamide; and mixtures thereof.

14. The admixture of claim 1 further comprising one or more members selected from the group consisting of hydraulic substances; aggregates; and reinforcing fibers.

15. The admixture of claim 1 further comprising water.

* * * * *